United States Patent [19]

Hosmer et al.

[11] Patent Number: 5,302,320

[45] Date of Patent: Apr. 12, 1994

[54] EMULSIFICATION COMPOSITION

[75] Inventors: Edward Hosmer, Westford, Mass.; Ronald D. LaRoche, 90 Jimney Dr., Westford, Mass. 01886

[73] Assignee: Ronald D. LaRoche, Westford, Mass.

[21] Appl. No.: 867,135

[22] Filed: Apr. 10, 1992

Related U.S. Application Data

[63] Continuation-in-part of Ser. No. 520,127, May 7, 1990, abandoned, which is a continuation of Ser. No. 43,215, Apr. 27, 1987, abandoned.

[51] Int. Cl.$^5$ .................. B01F 17/42; C11D 9/26; C11D 9/44

[52] U.S. Cl. ................... 252/356; 210/925; 252/122; 252/DIG. 6; 252/DIG. 14

[58] Field of Search ............. 252/354, 355, 356; 210/925

[56] References Cited

U.S. PATENT DOCUMENTS

| | | | |
|---|---|---|---|
| 3,998,733 | 12/1976 | Blanchard et al. | 210/925 |
| 4,316,806 | 2/1982 | Canevari | 210/925 |
| 4,613,448 | 9/1986 | Cheng | 252/DIG. 14 |
| 4,822,514 | 4/1989 | Becker | 252/DIG. 14 |

FOREIGN PATENT DOCUMENTS 0021571  7/1981  European Pat. Off. ............ 210/925

OTHER PUBLICATIONS

Derwent Abstracts, AN 82-70050E/33, "Degreasing Emulsion", Soviet Union SU-874749, Oct. 23, 1981.
Derwent Abstracts, AN 86-001531/01, "Liquid Detergent Composition", French Patent, FR 2564105, Nov. 15, 1985.
Derwent Abstracts, AN 87-057928/09, "Reprocessing Lacquer Waste", European Patent, EP-212214, Mar. 4, 1987.

*Primary Examiner*—Richard D. Lovering
*Attorney, Agent, or Firm*—Pearson & Pearson

[57] ABSTRACT

An emulsification agent for hydrocarbons is provided comprising an ethoxylated nonylphenol, the reaction product of tall oil and an alkanolamine and tripropylene glycol methyl ether. The agent optionally can include sodium xylene sulfonate.

16 Claims, No Drawings

EMULSIFICATION COMPOSITION

CROSS REFERENCE TO RELATED APPLICATIONS

This application is a continuation-in-part application Ser. No. 07/520,127, filed May 7, 1990, now abandoned which, in turn, is a continuation application of application Ser. No. 07/043,215, filed Apr. 27, 1987, now abandoned.

BACKGROUND OF THE INVENTION

1. Field of the Invention

This invention related to an emulsification agent for hydrocarbon compositions. More particularly, this invention relates to an emulsification agent for hydrocarbon compositions or for materials contaminated with hydrocarbon compositions.

2. Description of Related Art

In the past, it has been difficult to clean spills of hydrocarbon compositions which are immiscible with water. It has been common practice to treat gasoline and oil spills with large quantities of water and flushing the spills by the force of the water stream. Final cleanup was accomplished by use of absorbent materials such as sand or sawdust. In addition, if the hydrocarbon is insufficiently diluted, it can remain flammable. However, such treatment often leads to pollution of water in streams and ponds. This process is undesirable when the hydrocarbon contaminant is absorbed in a carrier material such as soil. It has also been proposed to utilize solvents which are miscible with the hydrocarbon composition in order to dilute and disperse the hydrocarbon composition. Oftentimes, this approach is undesirable since the solvents are either flammable or toxic or both. In addition, the use of these solvents is not effective when the hydrocarbon composition is absorbed in a material such as soil.

It would be desirable to provide a composition which safely emulsifies hydrocarbon compositions and which would permit further treatment of the emulsified hydrocarbon composition to render it inert such as by treatment with bacteria which utilize hydrocarbons as a nutrient source.

SUMMARY

The present invention provides a composition which can be diluted with water and then admixed with a hydrocarbon composition in order to emulsify the hydrocarbon composition. The hydrocarbon composition, also is rendered inflammable when mixed with appropriate concentrations of the composition of this invention. The composition of this invention comprises (a) an oil soluble water insoluble, ethoxylated nonylphenol derived from ethylene oxide donor and nonylphenol (b) the reaction product of tall oil fatty acid with an alkanolamine and (c) tripropylene glycol methyl ether. Optionally, the composition of this invention can contain sodium xylene sulfonate.

DESCRIPTION OF ILLUSTRATIVE EMBODIMENTS

In accordance with this invention, it has been found that the use of specific ingredients in combination produces a composition which is highly effective in emulsifying hydrocarbon compositions. The compositions of this invention are very effective in emulsifying hydrocarbon spills in water or on land or hydrocarbons admixed with a solid composition such as soil. In addition, the compositions of this invention effective for degassing and cleaning hydrocarbon storage tanks such as gasoline storage tanks and the like.

One ingredient of the compositions of this invention comprises an ethoxylated nonylphenol of Formula I.

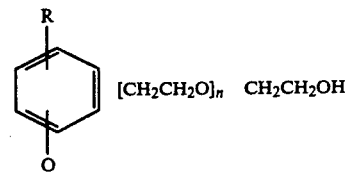

Wherein R is nonyl and n is a number from 4.5 to 5.5, preferably 5. A preferred ethoxylated nonylphenol typically has the physical characteristics set forth in Table I.

TABLE I

| | |
|---|---|
| HLB | 9.9 to 12.6 |
| SPECIFIC GRAVITY, 20/20° C. | 1.041 |
| REFRACTIVE INDEX, 20° C. | 1.4938 |
| FREEZING POINT, °C. | 0 |
| FLASH POINT, (PMCC) °F. | 430 |
| WEIGHT, POUNDS PER GAL, 20° C. | 8.7 |
| MOLECULAR WEIGHT (THEORY) | 484 |
| WATER SOLUBILITY | DISPERSIBLE |

The ethoxylated nonylphenol is oil soluble but not water soluble and functions to emulsify hydrocarbons. The ethyoxylated nonylphenol can be produced by reacting nonylphenol with ethylene oxide. The compound of Formula I can be formed by reacting between 5.5 and 6.5 moles ethylene oxide with 1 mole nonylphenol.

A second ingredient comprises the reaction product of tall oil and an alkanolamine. The reaction product of tall oil and an alkanolamine produces a soap which renders a hydrocarbon less viscous and more soluble in the composition of this invention. Typical alkanolamines which can be reacted with tall oil for use in this invention includes monoethanolamine, diethanolamine or triethanolamine with monoethanolamine being preferred.

Typical physical characteristics of this reaction product of tall oil and monoethanolamine are put forth in Table II.

TABLE II

| | |
|---|---|
| ACID NUMBER | 190 |
| ROSIN ACIDS % | 5 MAXIMUM |
| FATTY ACIDS % | 91.6 |
| SAPONIFICATION # | 193 |
| TITER °C. | 8 |
| UNSAPONIFIABLES | 3.5 |
| IODINE VALUE | 128 |
| VISCOSITY 100 F CPS | 23 |
| FLASH POINT °F. | 375 |
| BOILING POINT | 500° F. |

The precipitation of the reaction product takes place by use of an alkanolamine. The reaction is complete when the pH stabilizes at about 7.0, when the batch is tested for its effectiveness and is 100% soluble in water.

A third ingredient which is utilized in the composition of this invention comprises tripropylene glycol methyl ether. The tripropylene glycol methyl ether has a high flash point of about 200° F. or more and functions to aid in the penetration of the ethoxylated nonylphenol and the reaction product of tall oil and an alkanolamine into the hydrocarbon. In addition, this ingredient renders the composition of this invention dilutable in water. Derivatives of ethylene glycol are undesirable since they are toxic, have a lower boiling temperature than tripropylene glycol methyl ether, and tend to separate from the remaining components of the composition of this invention. In addition, tripropylene glycol methyl ether is less toxic than dipropylene or monopropylene glycol alkyl ethers. Furthermore, tripropylene glycol methyl ether is less flammable than isopropyl alcohol which previously has been utilized. Typical physical characteristics of tripropylene glycol methyl ether are set forth in Table III.

TABLE III

| Molecular weight | 206.3 |
| Boiling Point | 242.4° C. |
| Flash Point | 237° F. |

In a preferred form of this invention a fourth ingredient optionally is added which comprises sodium xylene sulfonate which assists in rendering the composition of this invention uniform and renders the product heat stable and freeze stable. Typical physical characteristics of sodium xylene sulfonate are set fourth in Table IV.

TABLE IV

| APPEARANCE | CLEAR/YELLOW |
| SPECIFIC GRAVITY | 1.118 |
| % VOLATILE | 55-60 |
| ODOR | MILD |
| BOILING POINT | GREATER THAN 212° F. |

The weight percent of the ingredients set forth above based upon the total weight of these ingredients, in the absence of water, for forming the composition of this invention are set forth in Table V.

TABLE V

| COM-PONENT | INGREDIENT | WEIGHT PERCENT EXAMPLE I | WEIGHT PERCENT EXAMPLE II |
|---|---|---|---|
| A | Ethoxylated nonylphenol | 64-69 | 59-69 |
| B | Tall oil derivative | 17-21 | 17-21 |
| C | Tripropyleneglycol methyl ether | 13-16 | 13-16 |
| D | Sodium xylene sulfonate | 0 | 0-7.1 |
| E | Colorant | 0-0.5 | 0-0.5 |

In use, the composition of this invention is diluted with water prior to contact with the hydrocarbon wherein the composition of this invention comprises between about 1 and 8 volume percent, preferably between about 1 and 6 volume percent of the mixture with water.

In a preferred embodiment of this invention, a colorant is added to provide a means for monitoring the degree to which the composition has penetrated the hydrocarbon being treated. Exemplary suitable colorants are dyes which can be employed including FD&C Red No.3 (Federal Index 45430:1), D&C Red No. 33 (Federal Index 17200) or mixtures thereof. These dye or colorants are not masked by the color of hydrocarbons so that the degree of penetration of the composition of this invention can be effectively monitored.

In accordance with another feature of this invention, a perfume can be added to the composition for the purpose of masking odor. One example of such a perfume is a sassafras perfume added in an small percentage (less than about 1%) until any odors can not sensed.

In use, the entire spill is covered and the composition of this invention is mechanically worked into the spill such as by circular motion, from the outer perimeter toward the center of spill. After application of the agent has been completed, the spilled area is agitated with water, using a continuous stream flow. Where large spills occur, it is preferred to introduce the agent through a foam eductor at about a 6% setting with approximately 90 GPM at the nozzle.

The agent of this invention can be used by fire departments for petroleum spills, shipyards and marinas for fuel spills and bilge cleaning, municipalities for fuel spills in sewers, holding ponds or lagoons contaminated by petroleum spills, industry where flammable solvents such as most aliphatic and aromatic petroleum distillates are used in the process of manufacturing, petroleum tank farms, drilling platforms, or in conditions where there is a danger from spillage or leakage of flammable or explosive petroleum liquids. The composition of this invention assists in prevention of fuel and oil related fire and explosions. The composition of this invention emulsifies and disperses petroleum distillate based spills, is completely miscible in water in all proportions, helps eliminate flammable vapors, and is biodegradable. The agent reduces fire hazards by emulsifying, dispersing and diluting flammable liquids and it will not support combustion. Treated areas are easily seen, due to the tracing dye that can be included in the composition.

The composition of this invention is a non-flammable water based blend of emulsifiers, wetting and flame inhibiting agents. The composition is equally effective in soft water, hard water and salt water. Gasoline, jet fuels, and certain flammable solvents will not reform when treated with the composition of this invention. It quickly emulsifies and removes slippery oil films and spills from highways. When mixed with gas and oil particles, it disperses in water, thus eliminating a potential volatile environment. The composition will rapidly break down fuel and oil in ship bilges. It can be added directly to the bilge and agitate with water, thus reducing the danger of fire or explosion. In the case of sewers, the composition can be poured directly into a manhole. The sewer then can be flooded with water or introduced through a foam eductor. The composition emulsifies the spill and disperses throughout the water, thus reducing the danger of fire or explosion. The composition of this invention renders hydrocarbons nonflammable after being mixed with water.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. An oil and water miscible composition for emulsifying a hydrocarbon composition consisting essentially of Component A which is ethoxylated nonylphenol, Component B which is a soap of tall oil and an alkanolamine, and Component C which is tripropylene glycol methyl ether wherein the weight percent of Component A is between about 64% and 69%, the weight percent of Component B is between about 17% and 21% and the weight percent of Component C is between about 13% and 16% based upon the total weight of Components A, B and C.

2. The composition of claim 1 which includes a colorant that can be detected visually when admixed with a hydrocarbon.

3. The composition of claim 1 additionally including water.

4. The composition of claim 1 additionally including perfume.

5. The composition of claim 1 wherein said alkanolamine is monoethanolamine.

6. The composition of claim 5 additionally including water.

7. The composition of claim 6 additionally including perfume.

8. The composition of claim 6 which includes a colorant that can be detected visually when admixed with a hydrocarbon.

9. An oil and water miscible composition for emulsifying a hydrocarbon composition consisting essentially of Component A which is an ethoxylated nonylphenol, Component B which is a soap of tall oil and an alkanolamine, Component C which is tripropylene glycol methyl ether and Component D which is sodium xylene sulfonate wherein the weight percent of Component A is between about 59% and 69%, the weight of Component B is between about 17% and 21%, the weight percent of Component C is between about 13% and 16% and the weight percent of Component D is up to about 7.1% based upon the total weight of Components A, B, C, and D.

10. The composition of claim 9 which includes a colorant that can be detected visually when admixed with a hydrocarbon.

11. The composition of claim 9 additionally including water.

12. The composition of claim 9 additionally including perfume.

13. The composition of claim 9 wherein said alkanolamine is monoethanolamine.

14. The composition of claim 13 additionally including water.

15. The composition of claim 14 additionally including perfume.

16. The composition of claim 14 which includes a colorant that can be detected visually when admixed with a hydrocarbon.

* * * * *